United States Patent [19]

Forehand

[11] Patent Number: 5,277,495
[45] Date of Patent: Jan. 11, 1994

[54] TEMPERATURE TO FREQUENCY CONVERTER

[75] Inventor: Gilbert H. Forehand, Duncan, Okla.

[73] Assignee: Halliburton Company, Duncan, Okla.

[21] Appl. No.: 873,308

[22] Filed: Apr. 24, 1992

[51] Int. Cl.⁵ .............................................. G01K 7/24
[52] U.S. Cl. .................................. 374/183; 374/136; 331/66; 331/141
[58] Field of Search ............... 374/136, 148, 163, 179, 374/183, 117; 331/66, 141

[56] References Cited

U.S. PATENT DOCUMENTS

| Re. 31,222 | 4/1983 | McCracken | 364/571 |
|---|---|---|---|
| 3,432,774 | 3/1969 | Fick | 331/141 |
| 3,490,286 | 1/1970 | Schwartz | 374/136 |
| 3,500,246 | 3/1970 | Werner | 331/141 |
| 3,512,408 | 5/1970 | Douglas, Jr. | 374/136 |
| 3,835,418 | 9/1974 | Gilbert | 331/141 |
| 3,906,391 | 9/1975 | Murdoch | 331/66 |
| 3,933,046 | 1/1976 | Ebrecht | 374/183 |
| 3,986,393 | 10/1976 | Hawley | 374/136 |
| 3,991,611 | 11/1976 | Marshall, III et al. | 73/151 |
| 4,033,186 | 7/1977 | Bresie | 73/154 |
| 4,109,196 | 8/1978 | Carmody | 374/183 |
| 4,143,549 | 3/1979 | Koehler | 374/136 |
| 4,157,659 | 6/1979 | Murdock | 73/151 |
| 4,393,485 | 7/1983 | Redden | 367/25 |
| 4,452,075 | 6/1984 | Bockhorst et al. | 73/151 |
| 4,468,968 | 9/1984 | Kee | 73/708 |
| 4,473,797 | 9/1984 | Shiota | 324/115 |
| 4,531,193 | 7/1985 | Yasuhara et al. | 364/551 |
| 4,553,223 | 11/1985 | Bouhelier et al. | 364/900 |
| 4,562,554 | 12/1985 | Stixrud et al. | 364/900 |
| 4,715,002 | 12/1987 | Vernon et al. | 364/422 |
| 4,866,607 | 9/1989 | Anderson et al. | 364/422 |

Primary Examiner—William A. Cuchlinski, Jr.
Assistant Examiner—G. Bradley Bennett
Attorney, Agent, or Firm—E. Harrison Gilbert, III.; Tracy W. Druce

[57] ABSTRACT

A temperature to frequency converter includes two temperature detectors having an electrical characteristic, such as resistance, that varies proportionally with sensed temperature. These devices are connected into an oscillator circuit that provides an electrical signal output having a frequency inversely proportional to sensed temperature. An amplitude control feedback loop connected to the oscillator circuit maintains the amplitude of the output signal constant.

14 Claims, 5 Drawing Sheets

TEMPERATURE TO FREQUENCY CONVERTER

BACKGROUND OF THE INVENTION

This invention relates generally to a temperature to frequency converter and more particularly, but not by way of limitation, to such a converter that provides a constant amplitude output signal having a frequency inversely proportional to sensed temperature.

Downhole static and circulating temperatures at various depths are typically important characteristics to know when drilling or completing an oil or gas well. For example, an operator can use knowledge of these temperatures to help determine retarder requirement for cement designed to be used in the well. That is, a cement composition designed for the right temperature will help minimize problems associated with the setting time of the cement. For example, a cement designed more accurately for thickening time and compressive strength development will help improve cement bonding and drillout times and minimize gas migration. Measurements of such temperatures can also be useful for stimulation purposes, for example.

I am aware of a downhole tool that can measure downhole static and circulating temperatures. This tool has a temperature to frequency converter that converts sensed temperature to an electrical signal having a frequency directly proportional to the sensed temperature (i.e., as temperature increases, frequency increases; and as temperature decreases, frequency decreases). The temperature sensitive element is a crystal cut so that an electrical characteristic (namely, resonance) of the crystal changes in response to temperature. Change of this characteristic changes the output frequency of an oscillator circuit in which the crystal is connected. Although this converter is functional, it has shortcomings.

One shortcoming of the crystal-based temperature to frequency converter of the aforementioned downhole tool is that the crystal is relatively fragile and is therefore susceptible to being broken in the rough environment of an oil or gas well. Another drawback of this type of converter is that the electrical conductors, or leads, connecting the crystal into the oscillator circuit have to be electrically and mechanically stabilized so that there is no capacitance change. That is, the leads between the temperature sensitive crystal and the oscillator circuit can affect the frequency response of the oscillator. Without stabilization, the output of this type of temperature to frequency converter would not be reliable. Still another shortcoming of this type of converter is that the crystal is relatively large; therefore, this size must be accommodated in the downhole tool where space is typically limited. The crystal of this type of converter also is typically limited to sensing temperatures up to about 150° C.

In view of the shortcomings of the crystal-based temperature to frequency converter, there is the need for an improved converter which does not have these shortcomings and yet can be used in an otherwise conventional downhole tool to measure static and circulating temperatures. Such an improved temperature to frequency converter should also be useful in order tools and other applications.

SUMMARY OF THE INVENTION

The present invention overcomes the above-noted and other shortcomings of the prior art by providing a novel and improved temperature to frequency converter. The converter of the present invention is particularly adapted for use in a downhole tool that can be dropped or lowered into an oil or gas well for sensing and recording downhole static and circulating temperatures.

The converter of the present invention uses temperature sensitive members that are more durable or rugged than the crystal sensor of the prior converter preferred to above, and the members used in the present invention are smaller so that they require less space in a downhole tool. These members also have relatively low thermal resistance, and they can operate up to about 200° C. The converter of the preset invention also does not require stabilization of leads connecting the temperature sensitive members to an oscillator circuit because such leads have no measurable effect on the frequency of the signal output by the oscillator. Other features of the present invention include relatively less power consumption than than the crystal-based converter referred to above, and inverse proportionality between the sensed temperature and the frequency of the output signal from the oscillator circuit of the present invention.

The temperature to frequency converter of the present invention comprises: a first member having an electrical characteristic responsive to temperature; a second member having an electrical characteristic responsive to temperature, the second member connected to the first member; oscillator means for providing a time-varying output signal having a frequency correlated to temperature to which the first and second members respond, the oscillator means including frequency control means for controlling the frequency of the time-varying output signal, and the frequency control means having the first and second members connected therein; and amplitude control means, connected to the oscillator means, for maintaining the time-varying output signal at a substantially constant amplitude.

In the preferred embodiment, the oscillator means is a Wien bridge oscillator having the first and second members disposed therein, and the first and second members are preferably a matched pair of platinum resistance temperature detectors. The amplitude control means preferably includes: rectifier means for providing a rectification of the output signal of the oscillator; a voltage reference; a summing integrator having a input connected to the rectifier means and to the voltage reference; and variable resistance means for providing a variable resistance to the oscillator in response to the summing integrator. The rectifier means preferably provides a negative rectification of the output signal. Also in the preferred embodiment, the frequency of the output signal is inversely proportional to temperature.

Therefore, from the foregoing, it is a general object of the present invention to provide a novel and improved temperature to frequency converter. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1A:
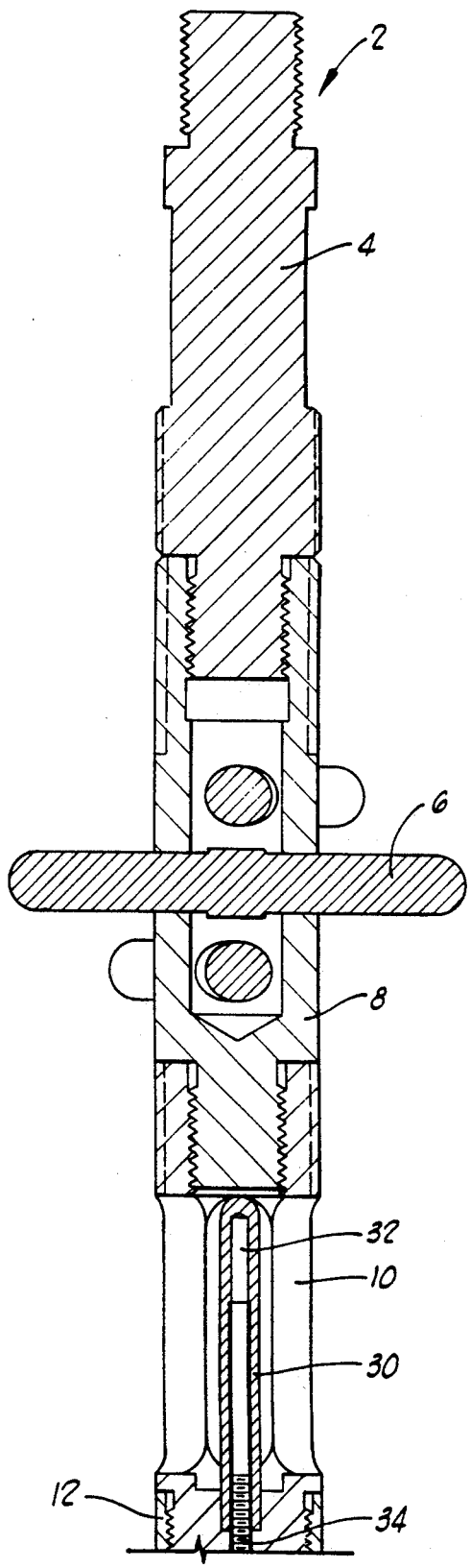
FIGS. 1A–1D are an elevational sectional view of a downhole tool in which the temperature to frequency converter of the present invention can be used.

A downhole tool 2 in which the temperature to frequency converter of the present invention can be used will be briefly described with reference to FIGS. 1A–1D; however, the tool 2 itself is not part of the claimed present invention.

The tool 2 is designed to be dropped into a well at a desired point in a drilling program so that a special trip of the drill string is not required (e.g., maximum fall rate in a particular implementation is about 1400 feet/minute—500 feet/minute for tool 2 drop rate and 900 feet/minute maximum fluid velocity); however, the tool 2 can be lowered into the well on a slick line or in a bundle carrier, for example. To retrieve a dropped tool 2 out of a well, a suitable retrieval tool is lowered and connected onto a top connector 4 shown at the top of FIG. 1A. Suitable retrieval tools include a 1½-inch Otis retrieving head, a sucker rod style tool, and a Totco style tool, for example.

Connected below the top connector 4 is a rubber centralizing washer 6 and its carrier 8 (it is contemplated that other types of centralizers, such as a finger type, can be used). Connected to the carrier 8 is a port member 10 below which electronics housing 12 (FIGS. 1A–1C) is connected. A lower rubber centralizing washer 14 (FIG. 1C) is mounted on a carrier 16 connected to the lower end of the housing 12. A shock absorber and return spring assembly 18 is connected below the carrier 16 (FIGS. 1C–1D).

Figure 1B:
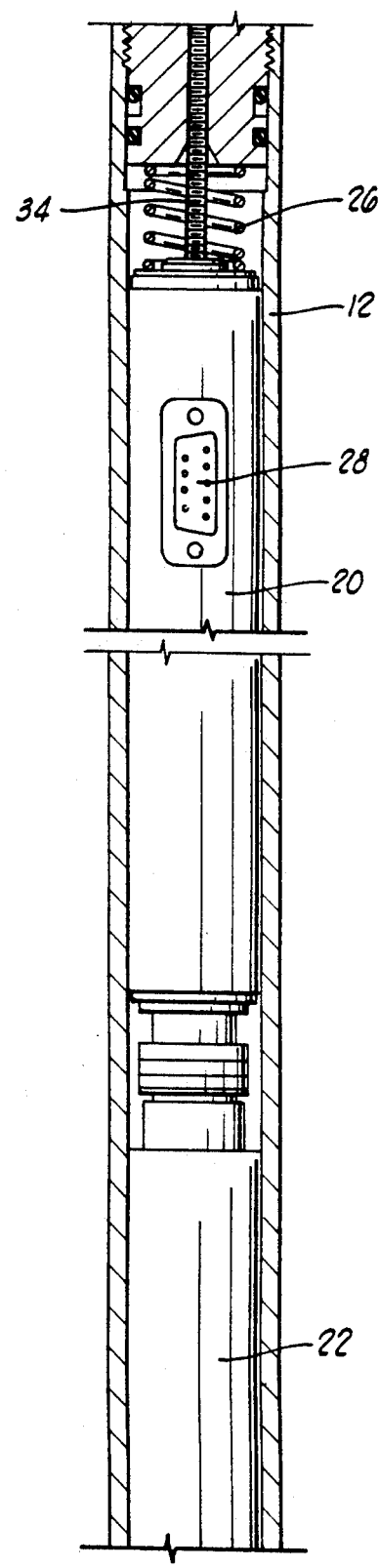
Figures 1C, 1D:
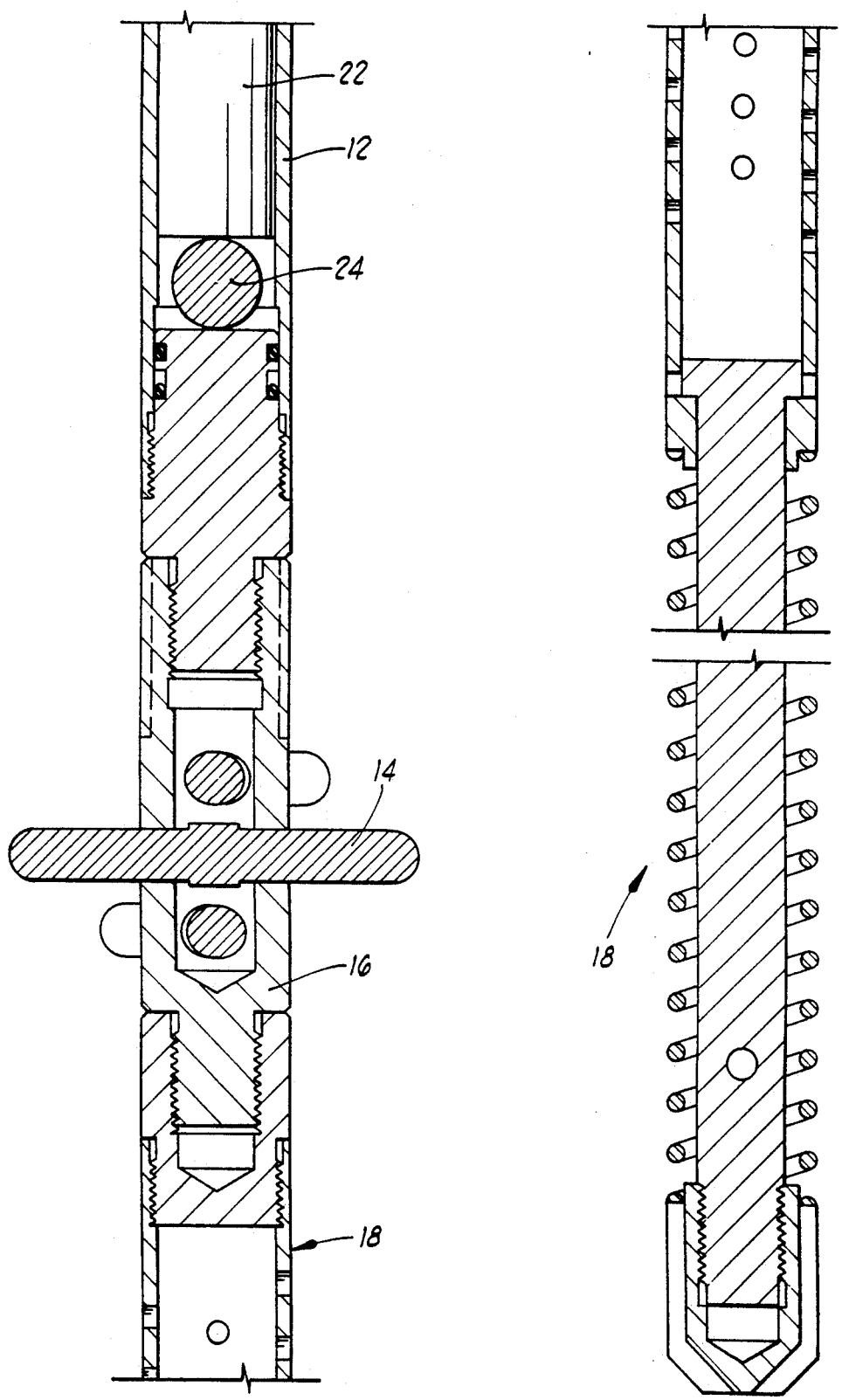

Inside the housing 12, there is a potted electronics assembly 20 (FIG. 1B) connected to a battery assembly 22 (FIGS. 1B–1C). These mechanically and electrically joined assemblies are cushioned between a lower resilient ball 24 (FIG. 1C) and an upper spring 26 (FIG. 1B). The electronics assembly 20 has a connector 28 (FIG. 1B) permitting external communications, such as data retrieval from and program input to a microprocessor-based recorder contained in the electronics assembly 20 but not forming part of the present invention.

Disposed in the port member 10 is a stinger 30 (FIG. 1A) that houses temperature sensitive members of the present invention which will be subsequently described. These members are located at the upper end of the stinger 30 as designated by the reference numeral 32. These members are connected to an oscillator circuit in the electronics assembly 20 through electrical conductor or cable 34.

The stinger 30 is exposed to well fluid through the openings in the port member 10. This enhances response time of the temperature sensing achieved using the temperature to frequency converter of the present invention. In the tool embodiment shown in FIGS. 1A–1D, the response time is typically five minutes. This is the time that the temperature of the temperature sensitive members 32 lags the actual temperature encountered as the tool 2 travels from one depth to another.

The tool 2 can be used to provide temperature information on location at the well site. Its data is an accurate representation of the static or circulating temperatures measured. The tool 2 is easy to use so that there is little or no lost rig time.

Examples of applications for the tool 2 include: profiling borehole circulating or static fluid temperature at a given depth for cementing or stimulation work; measuring elapsed time from start to gather information about the effects of circulation rates; profiling temperature to help determine retarder requirements and the need for additives for strength development; measuring temperatures in shallow-water, deepwater, or permafrost wells; measuring temperatures in deviated or horizontal hole sections; measuring temperature buildup following cement jobs; profiling temperatures in each casing string, not just production casing; and determining temperature for sidetrack cement plug design.

Figure 2:
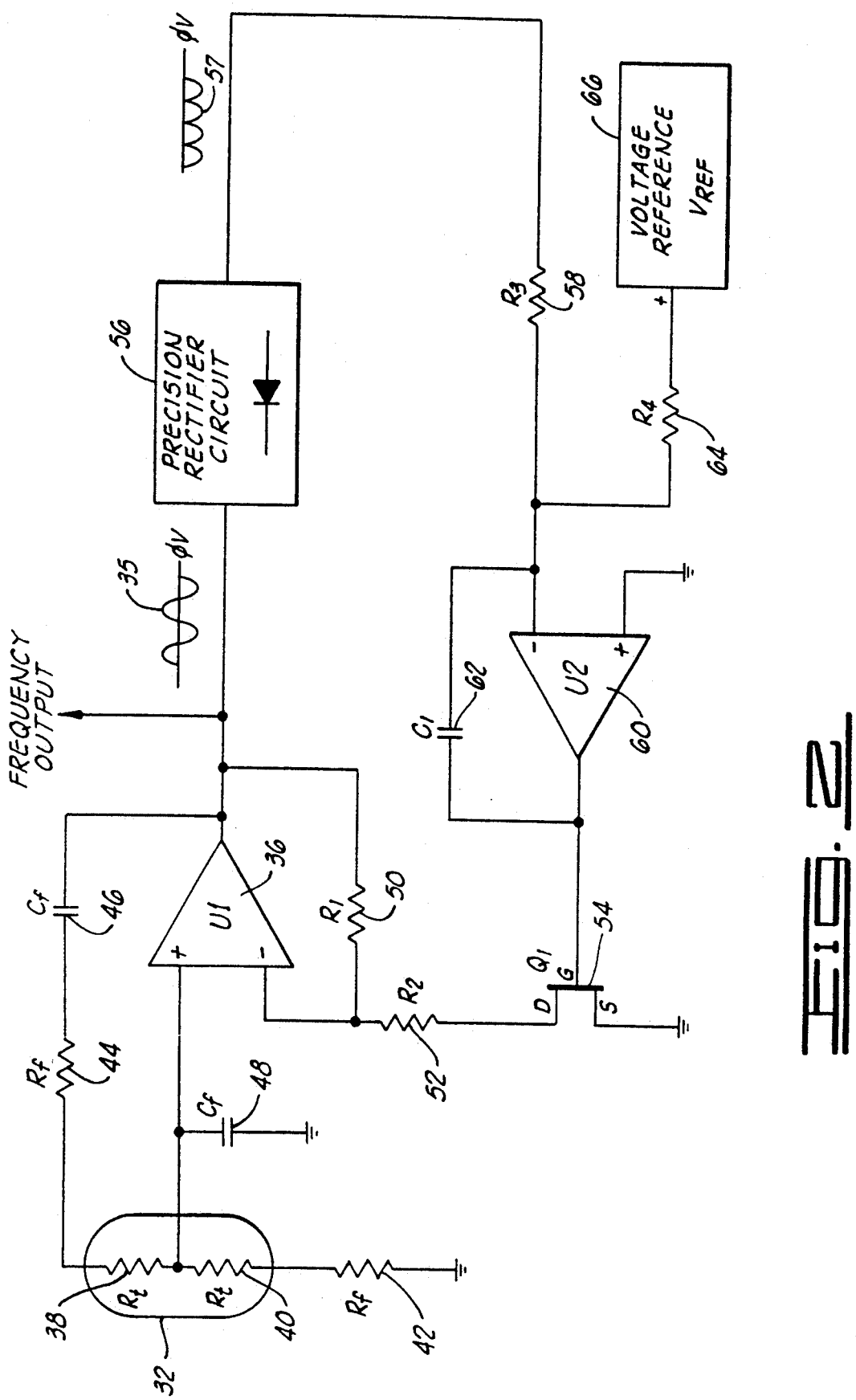
FIG. 2 is a functional block and schematic diagram of the preferred embodiment of the temperature to frequency converter of the present invention.

The following describes the temperature to frequency converter of the present invention. This converter is carried in electronics assembly 20 and also includes the temperature sensitive members 32 identified in FIG. 1A. This converter of the present invention produces a stable, repeatable sinusoidal frequency output 35 (FIG. 2) which is inversely proportional to the temperature seen by the 10 temperature sensitive members 32. Reference is made to FIG. 2 which shows a simplified circuit schematic.

Operational amplifier U1 (36) and its output frequency controlling resistor-capacitor (RC) network ($R_f$, $C_f$, and $R_t$) (38, 40, 42, 44, 46, 48) comprise a Wien bridge oscillator. Elements 38–48 are connected in the bridge network connected to the non-inverting input and the output of the operational amplifier U1 (36). Specifically, the node where the parallel RC network of $R_f$(40), $R_f$(42) and $C_f$(48) connects with the series RC network of $R_f$(38), $R_f$(44) and $C_f$(46) connects to the non-inverting input and the other end of $C_f$(46) connects to the output. Devices marked $R_f$(38, 40) are a pair of matched platinum RTD's (resistance temperature detectors) which linearly change their electrical characteristic, namely resistance, with temperature. The operating frequency of this Wien bridge oscillator is $$F = \frac{1}{2\pi(C_f)(R_t + R_f)}$$

where $C_f$(46, 48) and $R_f$(42, 44) are temperature stable components. Resistors $R_f$ (42, 44) are added in series with the $R_f$ devices (38, 40) to help linearize the frequency change with temperature. Thus, the frequency response of the oscillator to temperature seen by the $R_f$ devices (38, 40) is generally of the form $$F = \frac{K}{R_t + R_f}.$$

All of the other elements of the circuit shown in FIG. 2 are connected between the inverting input and the output of the operational amplifier U1 (36). These elements are employed in the illustrated control loop to stabilize the amplitude of the oscillator time-varying output signal at a desired level. This stabilization is important for several reasons:

1. Currents circulate in the $R_f$ devices (38, 40) during oscillation. This current must be kept to a stable, minimum level to prevent self-heating errors in the RTD's.

2. Amplitude variations can create frequency deviation errors in this type of oscillator.

3. Wien bridge oscillators require a closed loop gain of 3 to operate with a constant, stable amplitude. Resistors $R_i$ (50) and $R_2$ (52) and the drain to source resistance ($R_{ds}$) of transistor $Q_1$ (54) set this gain. Resistor $R_1$ (50) is connected between the inverting input and the output of the operational amplifier U1 (36). Resistor $R_2$ (52) is connected between this inverting input and the transistor $Q_1$ (54). Transistor $Q_1$ (54) is a junction field effect transistor operated in this circuit as a voltage-controlled variable resistor. The gain is $$G = \frac{R_1}{R_2 + R_{ds}} + 1.$$

A precision rectifier circuit 56 generates the negative absolute value of operational amplifier U1's (36) output as shown by waveform 57 in FIG. 2. This produces a current through $R_3$ (58) connecting the rectifier circuit 56 to the inverting input of a summing integrator that includes operational amplifier U2 (60) and capacitor $C_1$ (62) connected between the inverting input and the output of the operational amplifier U2 (60). Another input signal provided to this inverting input of the integrator is a reference current through resistor $R_4$ (64) connecting a positive precision voltage source, $V_{ref}$(66) to the inverting input of the operational amplifier U2 (60). The output of operational amplifier U2 (60) sets a gate voltage ($V_{gs}$) on the transistor $Q_1$ (54) which controls its drain to source resistance. The time constant of the integrator is set by the values of capacitor $C_1$ (62) and resistor $R_3$ (58) in parallel with resistor $R_4$ (64). This value is typically set to about 100 times the period of the lowest oscillator frequency. The time average value of $V_{gs}$ is determined by $V_{ref}$(66) and the values of resistors $R_3$ (58) and $R_4$ (64).

When the loop is operating at a stable amplitude, the gate voltage on transistor $Q_1$ (54) will hold it at the appropriate drain to source resistance to give operational amplifier U1 (36) a gain of 3.

Figure 3:
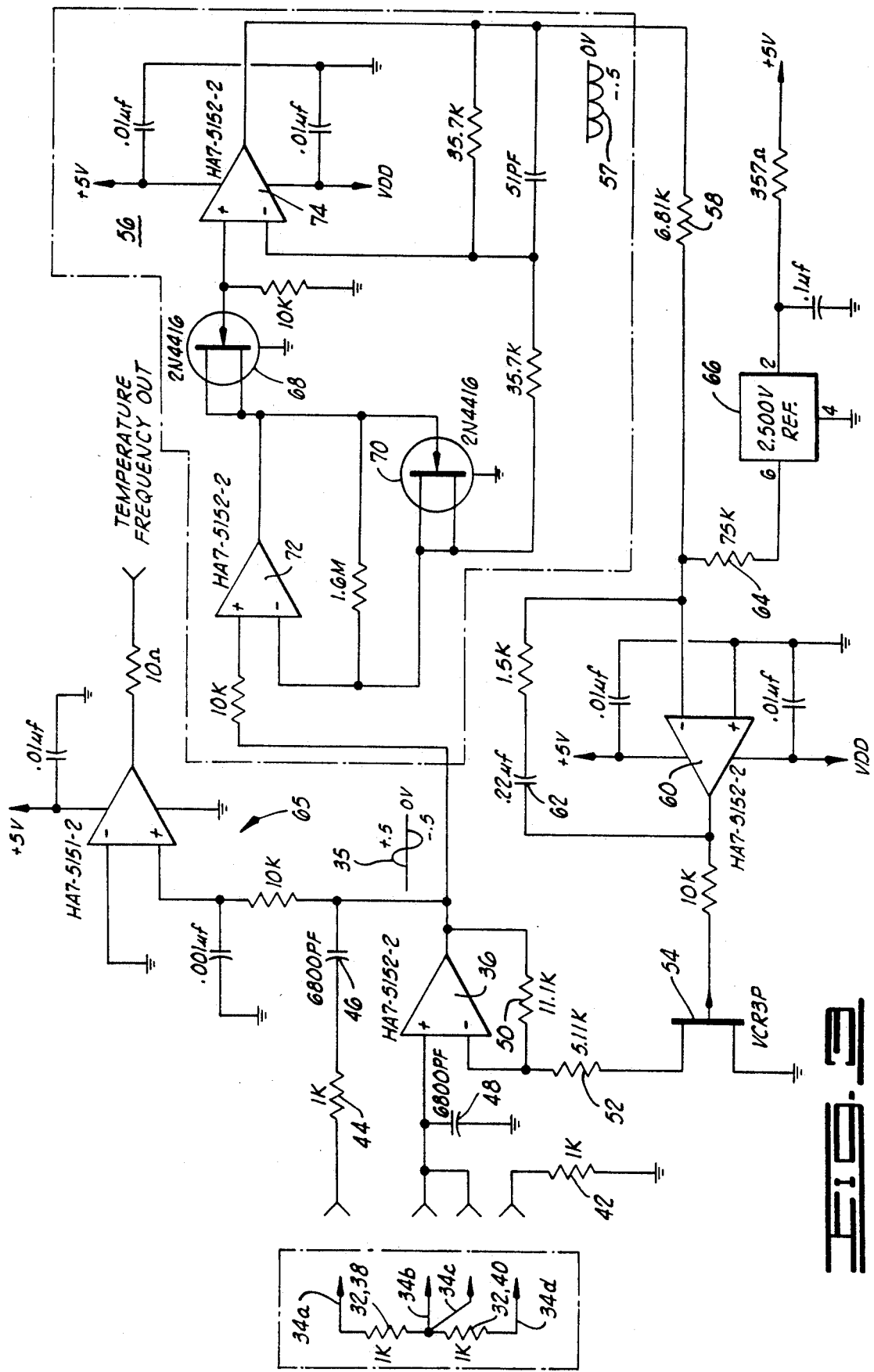
FIG. 3 is a schematic circuit diagram of a particular implementation of the converter shown in FIG. 2.

A specific implementation of the simplified circuit shown in FIG. 2 is shown in FIG. 3. Like components are identified by the same reference numerals used in FIG. 2.

The RTDs 38, 40 used in the particular implementation are nominal 1000-ohm resistances, model W2242 from Omega Engineering Inc. of Stamford, Ct., U.S.A. These are connected through the four leads 34a, 34b, 34c, 34d illustrated in FIG. 3, which are contained in the cable 34 shown in FIG. 1A. These leads connect into the oscillator circuit which operates in the kilohertz range rather than the megahertz range typical of the crystal type converter described hereinabove.

The oscillator circuit of the FIG. 3 implementation has a response of approximately 18 Hz/° C. The time-varying, alternating current output signal 35 from the oscillator circuit is buffered through buffer/comparator 65 which converts the sinusoidal waveform of the signal 35 to a square waveform.

The precision rectifier circuit 56 of FIG. 2 is shown in FIG. 3 as including N-channel JFETs 68, 70 connected to be used as high speed, low voltage drop diodes. These in conjunction with operational amplifiers 72, 74 and the associated illustrated resistors and capacitors form the rectifier 56 so that a negative rectified output is provided as illustrated by the waveform 57 in FIG. 3.

The voltage reference 66 is a model REF43FZ from Precision Monolithics, Inc. of Santa Clara, Ca., U.S.A.

The remainder of the circuit shown in FIG. 3 is self-explanatory in view of the general description given above with reference to FIG. 2.

The circuit shown in FIG. 3 works well up to at least about 180° C. and can work up to about 200° C. The power dissipation of this circuit is less than 30 milliwatts. Furthermore, the circuit can be readily converted to work with capacitive transducers such as NOA probes, pressure transducers, etc. by using the variable capacitance of such devices in place of or in conjunction with capacitances $C_f$ shown in FIGS. 2 and 3.

Figure 4:
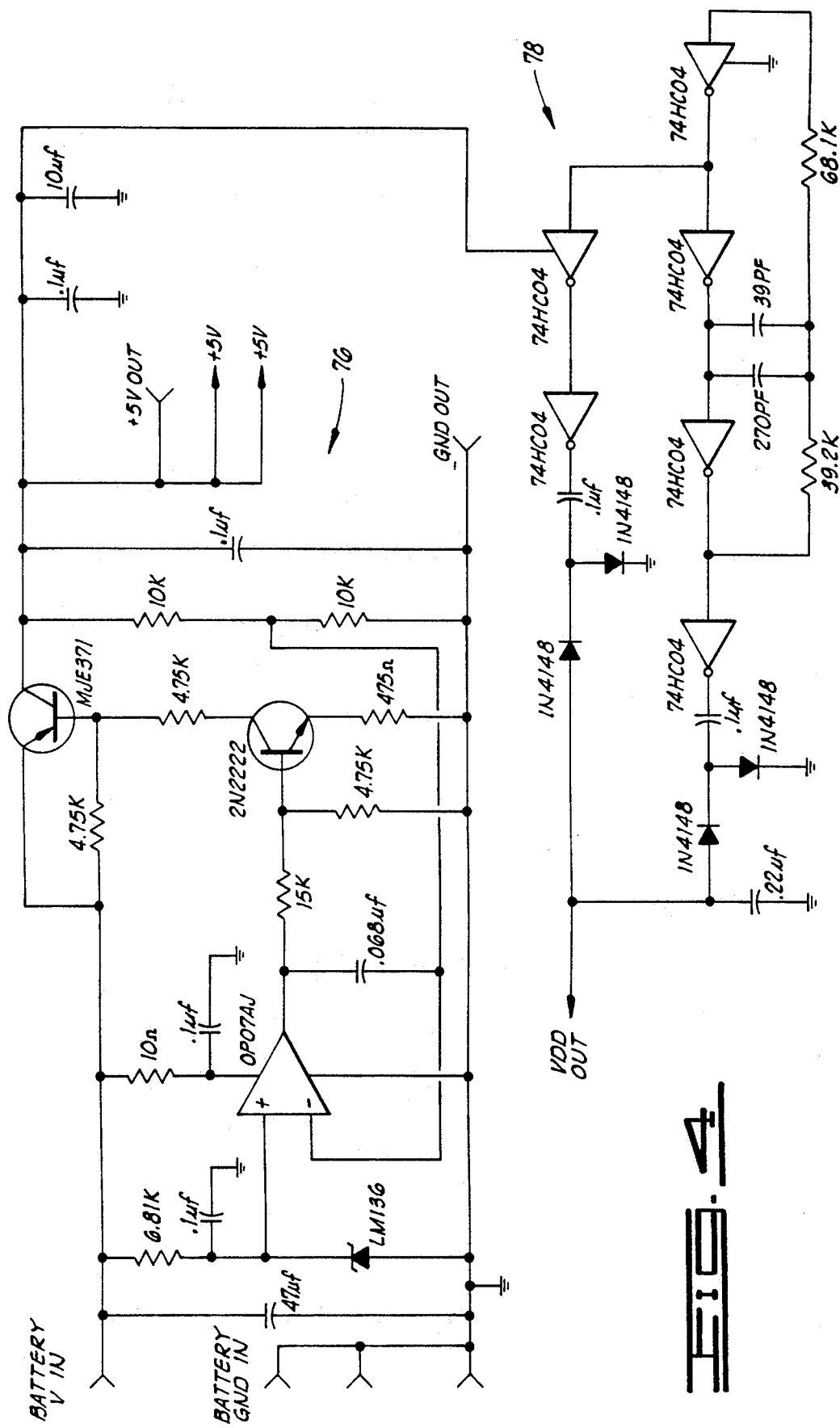
FIG. 4 is a schematic circuit diagram of a particular implementation of a power regulator and converter used for energizing the converter implementation of FIG. 3.

The particular implementation shown in FIG. 3 is energized by batteries in the battery assembly 22 shown in FIG. 1C. These batteries are connected to the circuit shown in FIG. 4. The circuit of FIG. 4 includes a +5-volt(dc) linear regulator 76 that also energizes a memory/controller board in the recorder portion of the electronics assembly 20. The FIG. 4 circuit also includes an oscillator/dual charge pump section 78 that converts the +5$V_{dc}$ to approximately −4$V_{dc}$ ($V_{DD}$ in FIG. 3).

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. A temperature to frequency converter, comprising:
   a first member having an electrical characteristic responsive to temperature;
   a second member having an electrical characteristic responsive to temperature, said second member connected to said first member;
   oscillator means for providing a time-varying output signal having a frequency correlated to temperature to which said first and second members respond, said oscillator means including frequency control means for controlling the frequency of the time-varying output signal, and said frequency control means having said first and second members connected therein; and
   amplitude control means, connected to said oscillator means, for maintaining the time-varying output signal at a substantially constant amplitude.

2. A temperature to frequency converter as defined in claim 1, wherein said oscillator means is a Wien bridge oscillator having said first and second members disposed therein.

3. A temperature to frequency converter as defined in claim 2, wherein said amplitude control means includes:
   rectifier means for providing a rectification of the output signal of said oscillator;
   a voltage reference;
   a summing integrator having an input connected to said rectifier means and to said voltage reference; and variable resistance means for providing a variable resistance to said oscillator in response to said summing integrator.

4. A temperature to frequency converter as defined in claim 3, wherein said rectifier means provides a negative rectification of the output signal.

5. A temperature to frequency converter as defined in claim 4, wherein said first and second members are a matched pair of platinum resistance temperature detectors.

6. A temperature to frequency converter as defined in claim 1, wherein said first and second members are a matched pair of platinum resistance temperature detectors.

7. A temperature to frequency converter as defined in claim 1, wherein said amplitude control means includes:
   rectifier means for providing a rectification of the output signal of said oscillator means;
   a voltage reference;
   a summing integrator having an input connected to said rectifier means and to said voltage reference; and
   variable resistance means for providing a variable resistance to said oscillator means in response to said summing integrator.

8. A temperature to frequency converter as defined in claim 7, wherein said rectifier means provides a negative rectification of the output signal.

9. A temperature to frequency converter as defined in claim wherein the frequency of the output signal is inversely proportional to temperature.

10. A temperature to frequency converter for producing a stable, repeatable frequency output inversely proportional to sensed temperature, comprising:
    a first temperature sensitive resistor;
    a second temperature sensitive resistor;
    a first operational amplifier having a non-inverting input, an inverting input and an output, said noninverting input connected to said first and second temperature sensitive resistors and said output communicating an output signal having frequency representative of temperature sensed by said first and second temperature sensitive resistors;
    a rectifier circuit connected to said output of said first operational amplifier;
    a voltage reference;
    a second operational amplifier having an inverting input connected to said rectifier circuit and to said voltage reference; and
    variable resistance means, connected to said first and second operational amplifiers, for providing a variable resistance connected to said inverting input and said output of said first operational amplifier.

11. A temperature to frequency converter as defined in claim 10, further comprising:
    a first resistor and a first capacitor, connected in series between said output of said first operational amplifier and said first temperature sensitive resistor;
    a second resistor and a second capacitor, connected to said second temperature sensitive resistor;
    a third resistor, connecting said rectifier circuit and to said inverting input of said second operational amplifier;
    a fourth resistor, connecting said voltage reference and said inverting input of said second operational amplifier; and
    a third capacitor, connected between said inverting input of said second operational amplifier and an output thereof.

12. A temperature to frequency converter as defined in claim 11, wherein said variable resistance means includes:
    a transistor connected to said output of said second operational amplifier;
    a fifth resistor, connected to said transistor and said inverting input of said first operational amplifier; and
    a sixth resistor, connected to said inverting input and said output of said first operational amplifier.

13. A temperature to frequency converter as defined in claim 12, wherein said rectifier circuit provides negative rectification of the output signal of said first operational amplifier.

14. A temperature to frequency converter for measuring temperature in an oil or gas well, comprising:
    a first member having an electrical characteristic responsive to temperature in an oil or gas well;
    a second member having an electrical characteristic responsive to the same temperature in the oil or gas well, said second member connected to and located with said first member;
    bridge oscillator means for providing a time-varying output signal having a frequency correlated to temperature to which said first and second members respond, said bridge oscillator means including frequency control means for controlling the frequency of the time-varying output signal, and said frequency control means having said first and second members connected therein; and
    amplitude control means, connected to said oscillator means, for maintaining the time-varying output signal at a substantially constant amplitude.

* * * * *